US010678650B1

(12) United States Patent
Tummala et al.

(10) Patent No.: US 10,678,650 B1
(45) Date of Patent: Jun. 9, 2020

(54) MANAGING SNAPS AT A DESTINATION BASED ON POLICIES SPECIFIED AT A SOURCE

(71) Applicant: EMC Corporation, Hopkinton, MA (US)

(72) Inventors: Himabindu Tummala, South Grafton, MA (US); Jean-Pierre Bono, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 623 days.

(21) Appl. No.: 14/674,358

(22) Filed: Mar. 31, 2015

(51) Int. Cl.
*G06F 11/14* (2006.01)
*G06F 16/11* (2019.01)
*G06F 16/23* (2019.01)

(52) U.S. Cl.
CPC ...... *G06F 11/1451* (2013.01); *G06F 11/1453* (2013.01); *G06F 16/125* (2019.01); *G06F 16/2365* (2019.01); *G06F 2201/84* (2013.01)

(58) Field of Classification Search
CPC ............ G06F 11/1451; G06F 11/1453; G06F 17/30371; G06F 17/30085; G06F 16/1844; G06F 16/125
USPC ........................................................ 707/649
See application file for complete search history.

(56) References Cited

U.S. PATENT DOCUMENTS

| 6,988,133 | B1 * | 1/2006 | Zavalkovsky | H04L 41/0893 709/220 |
| 7,529,782 | B2 * | 5/2009 | Prahlad | G06F 11/1435 |
| 7,769,722 | B1 * | 8/2010 | Bergant | G06F 16/184 707/681 |
| 8,010,756 | B1 * | 8/2011 | Linde | G06F 11/1466 707/641 |
| 8,180,742 | B2 * | 5/2012 | Claudatos | G06Q 10/10 707/694 |
| 8,352,431 | B1 * | 1/2013 | Protopopov | G06F 16/128 707/640 |
| 8,407,448 | B1 * | 3/2013 | Hayden | G06F 9/45533 711/203 |
| 8,793,371 | B1 * | 7/2014 | Nanekar | H04L 67/1097 709/220 |
| 8,838,556 | B1 * | 9/2014 | Reiner | G06F 16/904 707/694 |
| 8,959,299 | B2 * | 2/2015 | Ngo | G06F 11/1451 711/162 |
| 9,052,938 | B1 * | 6/2015 | Bhide | G06F 11/328 |
| 9,342,537 | B2 | 5/2016 | Kumarasamy et al. | |
| 2003/0182253 | A1 * | 9/2003 | Chen | G06F 16/10 |
| 2003/0182313 | A1 * | 9/2003 | Federwisch | G06F 11/2066 |
| 2011/0153697 | A1 * | 6/2011 | Nickolov | G06F 9/4856 707/827 |

(Continued)

FOREIGN PATENT DOCUMENTS

EP 1349088 A2 * 10/2003 .......... G06F 11/2066

*Primary Examiner* — Pierre M Vital
*Assistant Examiner* — Nargis Sultana
(74) *Attorney, Agent, or Firm* — BainwoodHuang (57) ABSTRACT

Improved techniques for managing snaps of a data object hosted by a source data storage system (source) involve specifying, by the source, a set of policies for snaps of the data object that are stored on a destination data storage system (destination). The technique includes transferring the set of policies from the source to the destination, to enable the destination to implement the specified set of policies on the snaps at the destination.

19 Claims, 7 Drawing Sheets

(56) References Cited

U.S. PATENT DOCUMENTS

| | | | |
|---|---|---|---|
| 2012/0110142 A1* | 5/2012 | Montagna | G06F 8/71 709/220 |
| 2012/0166389 A1* | 6/2012 | Shiozawa | G06F 16/128 707/610 |
| 2012/0233123 A1* | 9/2012 | Shisheng | G06F 11/004 707/639 |
| 2013/0191516 A1* | 7/2013 | Sears | G06F 8/71 709/220 |
| 2013/0282662 A1* | 10/2013 | Kumarasamy | G06F 11/14 707/649 |
| 2015/0039907 A1* | 2/2015 | Bowden | G06F 16/9017 713/190 |
| 2015/0066857 A1* | 3/2015 | Dayal | G06F 16/128 707/639 |
| 2016/0092463 A1* | 3/2016 | Vijayan | H04L 67/1095 707/626 |
| 2016/0205182 A1* | 7/2016 | Lazar | G06F 16/128 709/219 |

\* cited by examiner

MANAGING SNAPS AT A DESTINATION BASED ON POLICIES SPECIFIED AT A SOURCE

BACKGROUND

Data storage systems are arrangements of hardware and software that include storage processors coupled to arrays of non-volatile storage devices. In typical operation, storage processors service storage requests that arrive from client machines. The storage requests specify data objects (e.g., file systems, LUNs, vVols, and the like) to be accessed, overwritten, created, or deleted, for example. The storage processors run software that manages incoming storage requests and performs various data processing tasks to organize and secure the data stored on the non-volatile storage devices.

Data storage systems may implement snapshot technology to protect the data objects they store. For example, a data storage system may present a data object to a host machine. The host machine accesses the data object and can make changes to its contents over time. To protect the data object and its state at various points in time, the data storage system may take snapshots, or "snaps," of the data object at regular intervals or in response to user commands or particular events. Each snap provides a point-in-time version of the data object that users of host machines can access to restore from a previous version of the data object, such as to resume use of the data object from a previous, known-good state. Users may also restore from snaps to examine previous states of a data object, such as for historical or forensic purposes.

Data storage systems typically manage snaps and allow host machines to create, access, and delete snaps as needed. To this end, data storage systems may create and store attributes of snaps to facilitate their administration and control Attributes of snaps may include, for example, snap labels, retention policy, and whether snaps are read-only or read/write.

SUMMARY

Unfortunately, there are deficiencies with the above-described conventional approach to managing snaps of data objects. For example, we have recognized that it may be desirable to copy or otherwise transfer snaps to a remote data storage system, e.g., for remote snap archiving. In such circumstances, it would be left to administrators of remote data storage systems to set attributes of the snaps stored on the remote systems. Thus, the administrator who is in charge of directing creation of the snaps would lose control over how the snaps are treated at the remote system. Even if the same administrator could control both systems, establishing snap attributes on both systems would involve duplicated effort and the potential for errors.

In contrast with the above-described conventional approach to managing snaps, improved techniques for managing snaps of a data object hosted by a source data storage system (source) involve specifying, by the source, a set of policies for snaps of the data object that are stored on a destination data storage system (destination). The technique includes transferring the set of policies from the source to the destination, to enable the destination to implement the specified set of policies on the snaps at the destination.

Advantageously, the improved techniques promote single-point control of snaps of a data object, even when the snaps are located in a different data storage system. In some examples, the improved techniques also prescribe activities to be performed on snaps stored at the destination. In some examples, such activities promote efficiency in the local data storage system and reduce the likelihood of data loss and/or unavailability.

One embodiment of the improved techniques is directed to a method of managing snaps of data objects. The method includes establishing, on a source data storage system (source) storing a data object, policy information specifying a set of policies to be implemented at a destination data storage system (destination) on snaps of the data object created at the source and mirrored to the destination, each of the snaps at the destination (destination snaps) representing a point-in-time version of the data object at the source. The method also includes transferring the policy information established at the source to the destination to enable the destination to implement the set of policies specified by the policy information on the destination snaps at the destination.

Additionally, some embodiments are directed to a system constructed and arranged to manage snaps of data objects. The system includes a source data storage system (source) and a destination data storage system (destination), each including memory and controlling circuitry coupled to the memory. The controlling circuitry of the source is constructed and arranged to carry out a method of managing snaps of data objects.

Further, some embodiments are directed to a computer program product having a non-transitory, computer-readable storage medium which stores executable code, which when executed by a data storage system, causes the data storage system to perform a method of managing snaps of data objects.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques for managing snaps of a data object hosted by a source data storage system (source) involve specifying, by the source, a set of policies for snaps of the data object that are stored on a destination data storage system (destination). Advantageously, the improved techniques promote single-point control of snaps of a data object, even when the snaps are located in a different data storage system.

Figure 1:
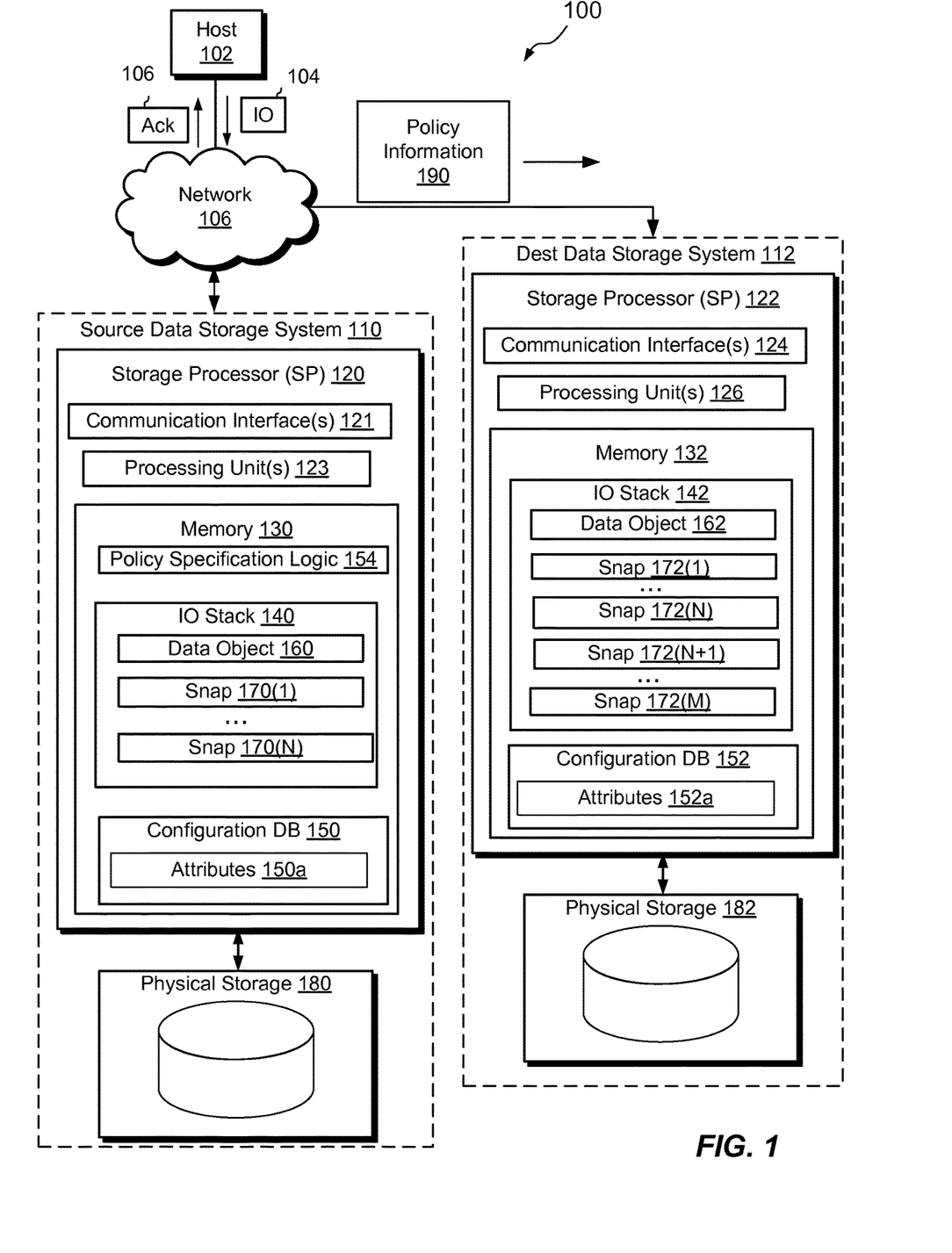
FIG. 1 is a block diagram illustrating an example electronic environment in which the improved technique can be carried out.

FIG. 1 shows an example electronic environment 100 in which embodiments of the improved techniques hereof can be practiced. Here, a host computing device ("host") 102 accesses a source data storage system 110 ("source") over a network 106. The source 110 includes a storage processor, or "SP," 120 and non-volatile storage 180. The storage 180 is provided, for example, in the form of hard disk drives and/or electronic flash drives. The source 110 may include multiple SPs like the SP 120. In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs. Additional information about data storage systems in which the improved technique hereof can be practiced is found in U.S. patent application Ser. No. 13/828,322, filed Mar. 14, 2013, the contents and teachings of which are incorporated by reference herein in their entirety.

The network 106 can be any type of network or combination of networks, such as a storage area network (SAN), local area network (LAN), wide area network (WAN), the Internet, and/or some other type of network, for example. In an example, the host 102 can connect to the SP 120 using various technologies, such as Fibre Channel (e.g., through a san), iSCSI, NFS, SMB 3.0, and CIFS. Any number of hosts 102 may be provided, using any of the above protocols, some subset thereof, or other protocols besides those shown. The SP 120 is configured to receive IO request 104 and to respond to such IO requests 104 by reading and/or writing the non-volatile storage 180 and sending an acknowledgment 108.

The SP 120 is seen to include one or more communication interfaces 121, a set of processing units 123, and memory 130. The communication interfaces 121 include, for example, SCSI target adapters and network interface adapters, for converting electronic and/or optical signals received from the network 106 to electronic form for use by the SP 120. The set of processing units 123 include one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons, for example.

The memory 130 is seen to include (i.e., realize by operation of programming code) an IO stack 140 and policy specification logic 150. The IO stack 140 provides an execution path for host IOs (e.g., IO request 104). The policy specification logic 150 is a software construct configured to cause SP 120 to carry out policy specification operations.

The 10 stack 140 includes a data object 160, e.g., a file system, a LUN, a vVol, or the like, as well as associated snaps 170(1), . . . , 170(N) of the data object 160. The snaps 170(1), . . . , 170(N) each represent a point-in-time version of the data object 160. It should be understood that the data object 160 and associated snaps 170(1), . . . , 170(N) are logical constructs within the IO stack 140 and that the underlying data and metadata that support these structures typically reside in the storage 180. Although only a single data object and associated snaps are shown, it should be understood that SP 120 may host any number of data objects, like the data object 160, and their associated snaps, limited only by available computing resources and storage.

Policy specification logic 150 causes SP 120 to establish policy data that specifies policies to be implemented on each snap on the source 110. For example, there may be a retention policy dictating that snaps created on the source 110, such as snaps 170(1), . . . , 170(N), be retained in storage 180 for at least a specified time, e.g., 30 days. In response to generation of a new snap, policy specification logic 150 causes SP 120 to store such retention times in memory 130. In some arrangements, SP 120 stores policy data 190 in a configuration database that associates snap identifiers with respective policies.

The source 110 is also seen to be in communication with a destination data storage system ("destination") 112 over the network 106. As shown in FIG. 1, the destination 112 is structured similarly to the source 110, although this is by no means a requirement. For example, the destination 112 includes one or more communication interfaces 124, a set of processing units 126, memory 132, and non-volatile storage 172. The memory 132 is seen to include an IO stack 142, which in turn includes a data object 162 (which itself may be a snap) and associated snaps 172(1), . . . , 172(N), 172(N+1), . . . , 172(M) of the data object 162.

It should be understood that the snaps 172(1), . . . , 172(N) are respective mirrors of the snaps 170(1), . . . , 170(N). Also, the data object 162 on the destination 112 represents a point-in-time version of the data object 160. In an example, the data object 160 is a live, production object that is continually begin updated, whereas the data object 162 may be a snap of the data object 160. The data object 160 and snaps 170(1), . . . , 170(N) is stored in physical storage 180, whereas the data object 162 and snaps 172(1), . . . , 172(N) are stored in physical storage 182. Thus, the physical storage supporting the data object and its snaps on the source 110 is independent of the physical storage supporting the data object and snaps on the destination 112.

The destination 112 may also store snaps 172(N+1), . . . , 172(M). In an example, snaps 172 (N+1), . . . , 172(M) are mirrors of snaps of the data object 160 at the source 110 that have since been removed from the source 110. Thus, for example, the destination 112 may be used for snap archiving and may retain snaps for a longer period of time than does the source 110.

During operation, SP 120 establishes policy information 190 that specifies a set of policies to be implemented at the destination 112, e.g., on snaps 172(1), . . . , 172(N), 172(N+1), . . . , 172(M) of the data object 162. The set of policies may be expressed as attributes and may be provided on a per-snap basis and/or altogether for all snaps. For example, one such policy may specify a retention policy for a snap, e.g., for requiring the snap to be retained on the destination 112 for a minimum amount of time. Other policies may relate to activities to be performed on the snaps at the destination. Yet other policies may describe how the destination 112 stores the data object 162 and snaps 172(1-M), e.g., whether their data may be compressed or subject to de-duplication.

After SP 120 establishes the policy information 190, SP 120 transfers the policy information 190 to the destination 112 over the network 106. Upon receipt of the policy information 190, the destination 112 stores the policy information 190 in memory 132. For example, the SP 122 stores policy information in a configuration database. The destination 112 may then implement the set of policies specified by the policy information 190 on the snaps 172(1), . . . , 172(N), 172(N+1), . . . , 172(M).

Figure 2:
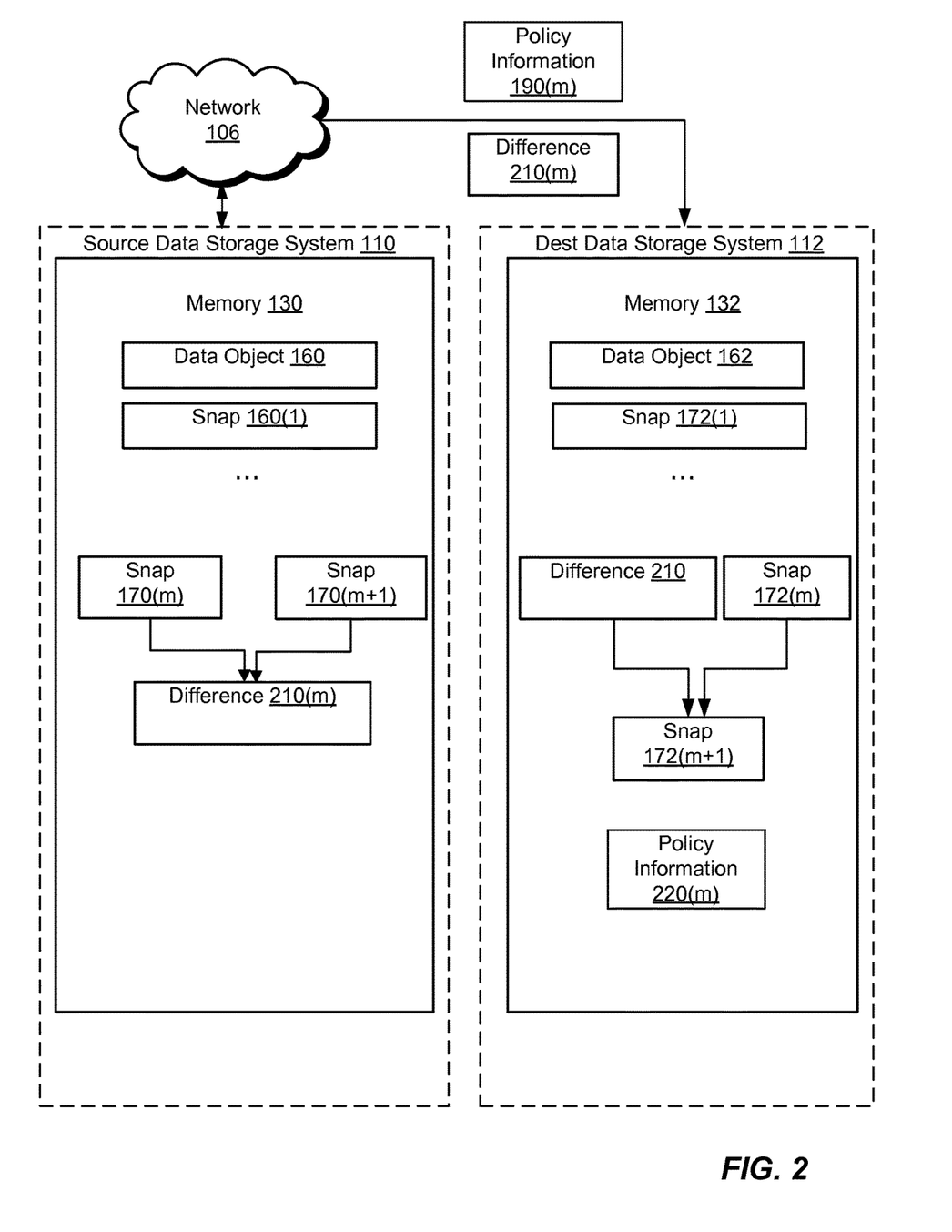
FIG. 2 is a block diagram illustrating an example transfer of policy information in the electronic environment of FIG. 1.

FIG. 2 illustrates an example configuration of the source 110 and destination 112 by which policy information may be transferred. In this configuration, the SP 120 is configured to transfer policy information from source to destination on a per-snap basis. Here, the source 110 stores a data object 160 and associated snaps 170(1), . . . , 170(M). Further, the destination 112 stores a mirrored data object 162 and associated snaps 172(1), . . . , 172(M). It should be understood that snap 172($k$) contains the same data as in snap 170($k$).

During operation, SP 120 (FIG. 1) generates a new snap 170(M+1) on the source 110 and policy information 220(M) specific to that snap. In order to mirror the new snap 170(M+1) to the destination 112, SP 120 forms a difference 210(M) between new snap 170(M+1) and previous snap 170(M). The difference 210(M) includes a list of blocks that differ between the two snaps.

After forming the difference 210(M), the SP 120 sends the difference 210(M) to the destination 112 over the network 106. In an example, the destination 112 is configured as a target of snapshot-shipping replication for the data object 160 on the source 110. In this case, the SP 120 sends the difference 210(M) to the destination 112 as part of a snapshot-shipping replication operation. More information about generating snaps across replication sites may be found in copending U.S. patent application Ser. No. 14/319,622, filed Jun. 30, 2014, the contents and teachings of which are hereby incorporated by reference in their entirety.

When sending the difference 210(M) to the destination 112 over the network 106, the SP 120 also sends the policy information 220(M). For example, the source 110 may send the policy information 220(M) along with a payload of snapshot-shipping metadata sent with the difference 210(M). When the destination 112 receives the difference 210(M) and the policy information 220(M), the destination 112 creates a new destination snap 172(M+1) and applies the policy information 220(M) to the new snap.

The SP 122 (FIG. 1) on the destination 112 creates the new destination snap 172(M+1) as a mirror of the new snap 170(M+1) on the source 110. In one example, the SP 122 forms new destination snap 172(M+1) by adding the difference 210(M) to the previous destination snap 172(M). In another example, the SP 122 applies the difference 210(M) to the data object 162, to bring the data object 162 into a content-consistent state with the snap 170(M+1). The SP 122 then generates the new destination snap 172(M+1) as a snap of the data object 162.

When the SP 122 receives the difference 210(M), the SP 122 stores the policy information 220(M) in the memory 132. For example, the SP 122 may store the policy information 220(M) in entries in the configuration database in the memory 132. Each entry may include an identifier of the new mirrored snap 172(M+1) and values describing policies to be applied to the new mirrored snap 172(M+1).

Figure 3:
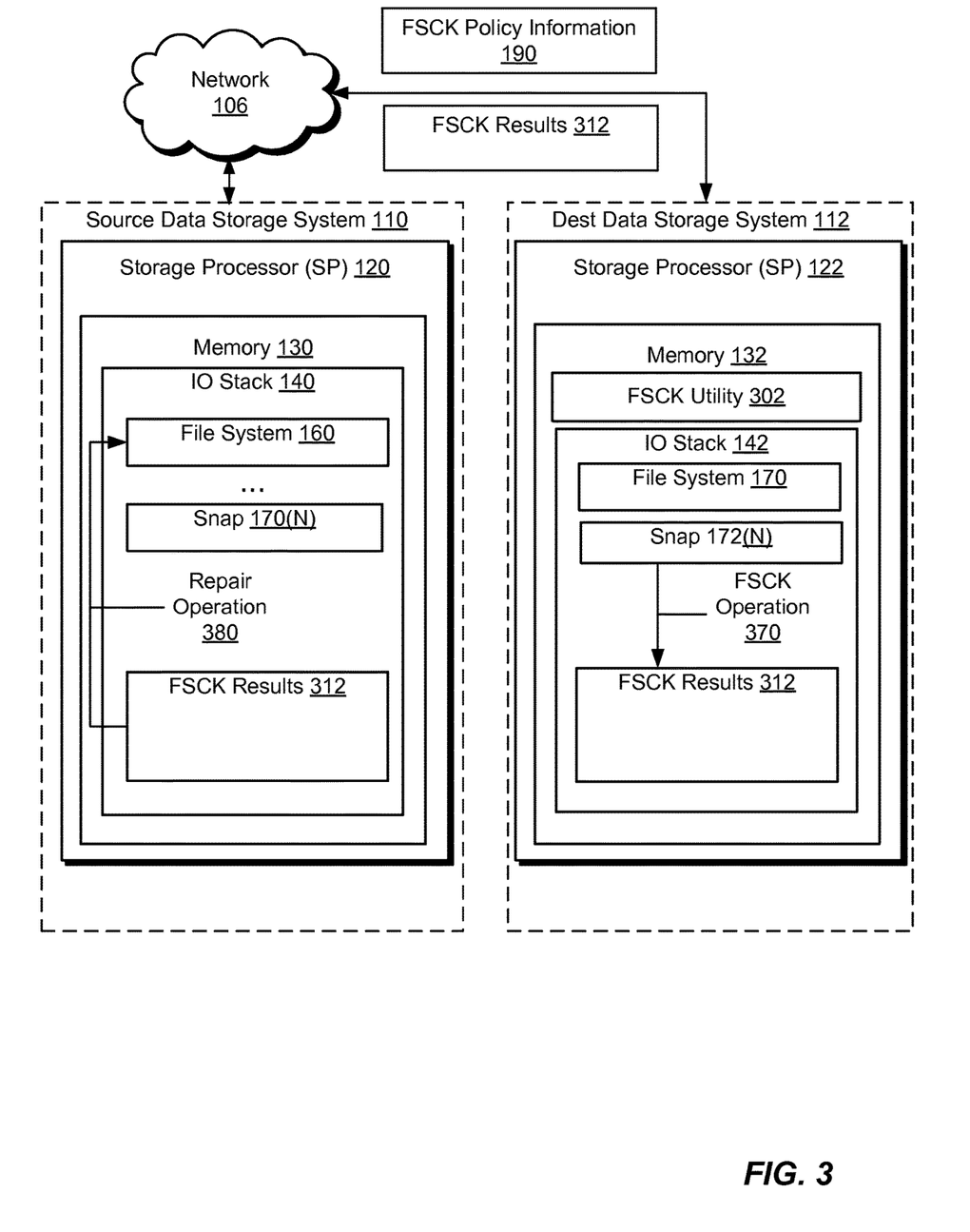
FIG. 3 is a block diagram illustrating an example file system consistency check operation in the electronic environment of FIG. 1.

It FIG. 3 illustrates an example configuration of the source 110 and the destination 112 for performing a file system consistency check. Here, the data object is a file system and the policy information sent when mirroring a snap from source 110 to destination 112 specifies that the destination 112 is to perform a file system consistency check. As is known, a file system consistency check (FSCK) is a process for checking a file system (or a snap thereof) for inconsistencies in file system metadata. FSCK operations may generate pass or fail results, identify errors, and suggest repairs. Because file systems may be large and FSCK may take considerable time to run, it may be beneficial for the source 110 to specify that the destination 112 perform FSCK on a snap of the data object at the destination 112, rather than for the source, which may already be busy servicing IO$s$, to also be burdened with having to perform FSCK locally. In the example of FIG. 3, the source 110 may specify an FSCK policy for a snap, and the destination may implement the policy once the snap has been mirrored to the destination. The destination 112 may then run FSCK locally, if the FSCK policy requests that it do so, and report results back to the source 110.

In the configuration shown in FIG. 3, destination 112 includes an FSCK utility within memory 132. FSCK utility 132 contains instructions that cause the SP 122 to perform an FSCK operation 170 on one of the mirrored snaps 162(1), . . . , 162(N). It is advantageous for the SP 122 to perform the FSCK operation 170 on a mirrored snap because the SP 120 is free to continue normal operation even as the FSCK operation 170 is performed on the destination snap 162(N).

The FSCK policy information 320 may indicate an event at which the SP 122 performs the FSCK operation 170 on the snap 162(N), e.g., upon creation, every year, in response to various errors indicating a corrupted file system, and so on.

During an example operation, SP 120 establishes FSCK policy information 320 as part of the establishment of other policies such as retention in response to the creation of snap 160(N). SP 120 then sends FSCK policy information 320 to the destination 112 over network 106 as described above in connection with FIG. 2.

The FSCK operation 170 produces a set of FSCK results 312. In some arrangements, the FSCK results 312 include information about metadata within the snap 162(N) that were found to be inconsistent with other metadata within the snap 162(N).

Upon completion of the FSCK operation 170, the SP 122 sends the FSCK results 312 to the source 110 over the network 106. Upon receipt of the FSCK results 312, the SP 120 stores the FSCK results 312 in the memory 130. The SP 120 on the source 110 may then initiates a repair operation 380 on the file system 350. That is, rather than disrupt normal storage processing by running an FSCK operation on the source 110, the SP 120 merely applies the FSCK results 312 to the file system 160, resulting in a much faster and less disruptive repair process.

At some point, the file system 160 may start behaving unexpectedly or show signs of damage or corruption. When this occurs, the source 110 may check the FSCK results 312 to identify a last known-good snap of the file system 160. The source 110 may then perform a restore operation, to copy the last known-good destination snap back to the source and to resume operations using that snap as the production object. Although some data loss may occur, data availability can be restored quickly, with little disruption to hosts.

Figure 4:
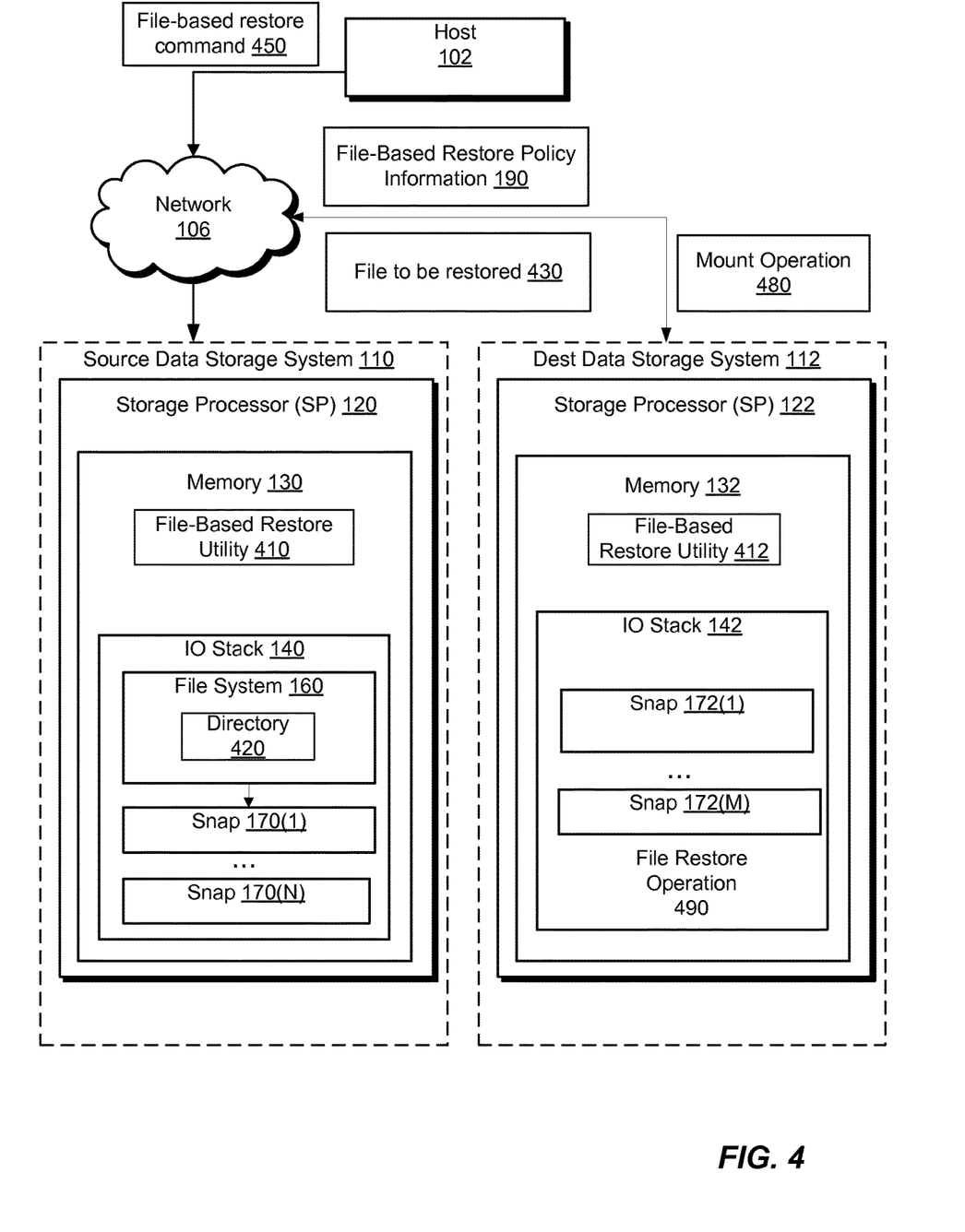
FIG. 4 is a block diagram illustrating an example file-based restore operation in the electronic environment of FIG. 1.

FIG. 4 illustrates an example configuration of the source 110 and the destination 112 for enabling a file-based restore operation to be performed using a snap at the destination 112. Here, the data object 160 is a file system. The file-based restore operation, when performed on a snap 172(1) at the destination, is configured to restore a specified file of a snap 172(1) in the destination 112 to the file system 160.

In the configuration shown in FIG. 4, the source 110 and the destination 112 each have a respective file-based restore utility 410 and 412. In many cases, only the source needs to have the file-based restore utility in order to effect the file-based restore operation 490. File-based restore utility 410 contains instructions that cause the SP 120 to perform a file-based restore operation 490 on a snap 172(1) in the destination 112.

In this example, the file-based restore operation 490 occurs in two parts. First, a user at the host 102 issues a request to the source 110 to perform a file-based restore operation to restore a file to a directory 420 in file system 160. For example, the user may issue a command 450 while viewing the directory 420 from the host 102. In response, the source 110 returns a list of snaps 172(1), . . . , 172(M) in the destination 112 that contain the directory 420. In some arrangements, the list also includes snaps 170(1), . . . , 170(N) in the source 110 that include the directory 420. In some examples, snaps that do not include the directory 420 are excluded from the list. Second, the user selects one of the snaps on the list and selects a file 430 or multiple files to be restored from the directory 420. The SP 120 then restores the file 430 to the directory 420 in the file system 160.

The file-based restore policy information 440 indicates whether the SP 120 should include particular destination snaps in the list of snaps returned to the host 102. For example, the destination 112 may store hundreds or thousands of snaps that all include the directory 420, such that it is impractical for the list to include all of them. Thus, in one example, the source 110 may provide the policy information 440 as an attribute on a per-snap basis, with the attribute set to TRUE to include the snap in file-based restore operations or to FALSE to exclude it. Because number of snaps may be large, another option is to specify the policy information 440 on a per-data-object basis, which applies to all snaps of the data object, rather than on a per-snap basis. The attribute may specify, for example, that only a specified percentage of snaps be made available for file-based restore operations. The destination 112, upon receiving the policy information 440, may then apply attributes to individual snaps, e.g., in the configuration database, to implement the specified policy, such that individual snaps are either included in file-based restore operations or not. For example, if the policy information 440 specifies that 10% of snaps should be included in file-based restore operations initiated from the source 110, then the destination 112 may set a file-based restore attribute to TRUE for one out of ten snaps and may set the same attribute to FALSE for nine out of ten.

During operation, the SP 120 establishes the file-based restore policy information 440 for a snap, for example, 172(1). Sometime later, the SP 120 receives a request 450 from the host 102 to perform the file-based restore operation 490 specifying the directory 420 of the file system 160. In response, the SP 120 determines which of the snaps 172(1), . . . , 172(M) in the destination 112 should be included in the file-based restore operation 490 based on the value of the attribute of each of the snaps. The file-based restore utilities 410 and 412 then coordinate to generate the list of snaps, e.g., by mounting both source and destination snaps having the attribute set, identifying mounted snaps that include the directory 420, and returning a list of the identified snaps to the host 102. If a selection is made to restore from a destination snap, the file-based restore utilities 410 and 412 again coordinate to copy selected file or files in the directory 420 of the selected snap back to the source 110, where they are restored to the directory 420 in the file system 160. If a selection is made to restore from a source snap, the file-based restore utility 410 performs the restore locally.

It should be understood that an advantage of performing such a file-based restore in this way is that the user at the host 102 does not need to worry about whether a snap is in the source 110 or the destination 112. The user simply sees is a single list of snaps that have the directory 420, from which the user may select a snap having the file 430. Also, as destination snaps may extend significantly further back in time than source snaps, it may be more likely that user will be able to restore old files of old versions of files than if file-based restore were limited only to the source.

Figure 5:
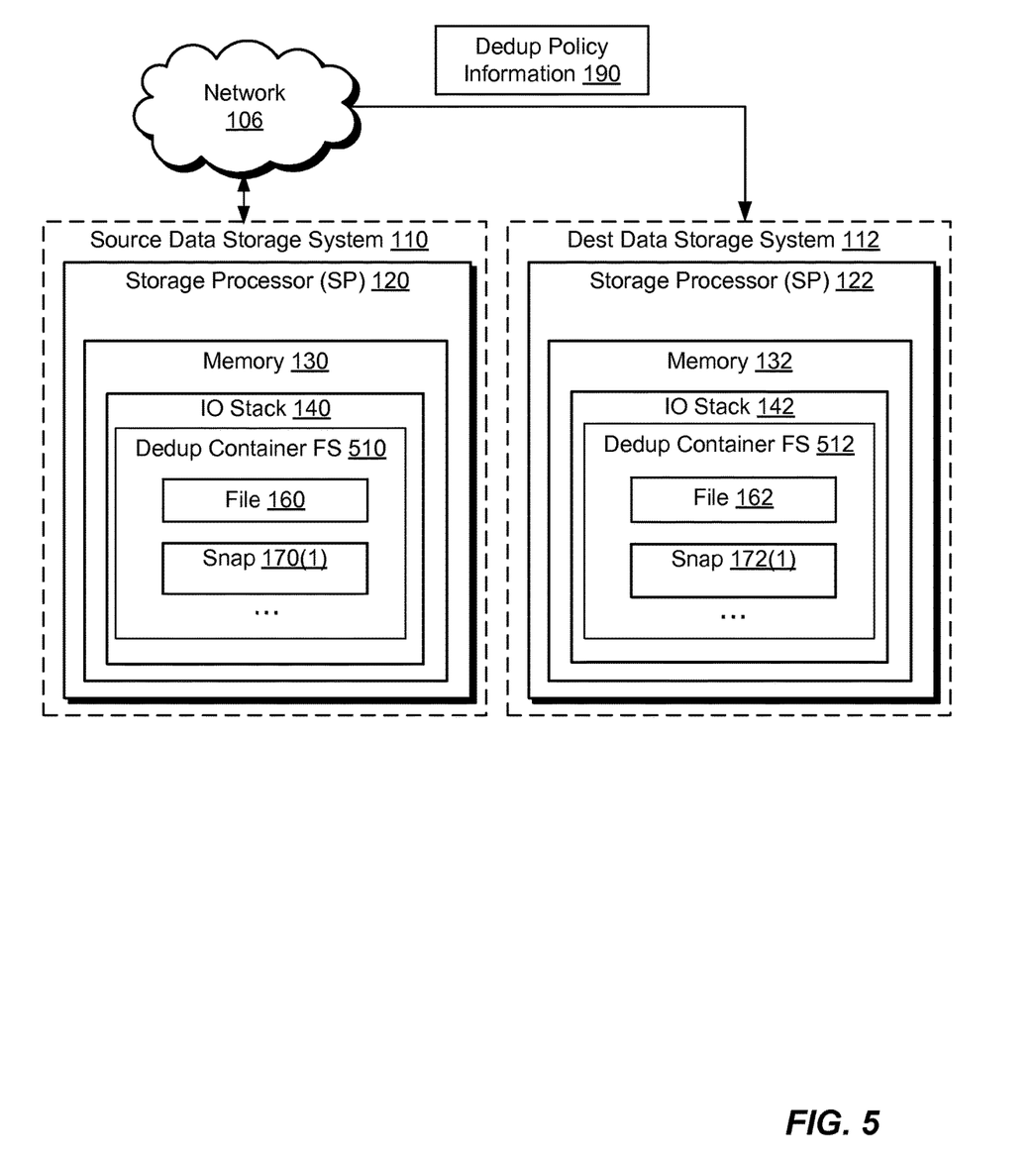
FIG. 5 is a block diagram illustrating example container file systems in the electronic environment of FIG. 1.

FIG. 5 illustrates an example configuration in which the data object 160 in the source 110 is a container file representing a data object, such as a host file system (HFS), a virtual volume (vVol), or a LUN, realized in a container file system 510. In this example, container file system 510 is a deduplication container file system supporting deduplication operations. The SP 120 may host any number of such container file systems, although only one container file system is shown. The container file system 510 includes an inode structure including an inode and indirect blocks. The inode provides file-specific information about the container file 520 in the container file system 510. The inode structure includes location information (i.e., locations of data blocks) where data of the file are stored. It should be understood that any container file system might contain multiple files, with each having its own entry in a respective inode table. Here, each container file system stores not only the container file 520 representing a data object, but also associated snaps 530(1), . . . , 530(N) of the container file 520.

In this example configuration, the destination 112 also contains a container file system 512 in which a container file 522 is realized. In this case, however, the container file 162 is a mirror of the container file 160 and the snaps 172(1), . . . , 172(N) are mirrors of the respective snaps 170(1), . . . , 170(N).

The policies specified by container policy information 540 indicate a configuration of the container file system 512. It should be understood that the SP 120 establishes the container policy information 540 prior to mirroring the container file 160 to create the mirrored container file 162 in the destination 512. In the example shown in FIG. 5, the container file system 510 supports deduplication operations. Then the policies dictate that the container file system 512 will also support deduplication operations, e.g., generate data structures for each data block of the container file 162 and its associated snaps 172(1), . . . , 172(N) in order to facilitate deduplication operations on that data block.

Figure 6:
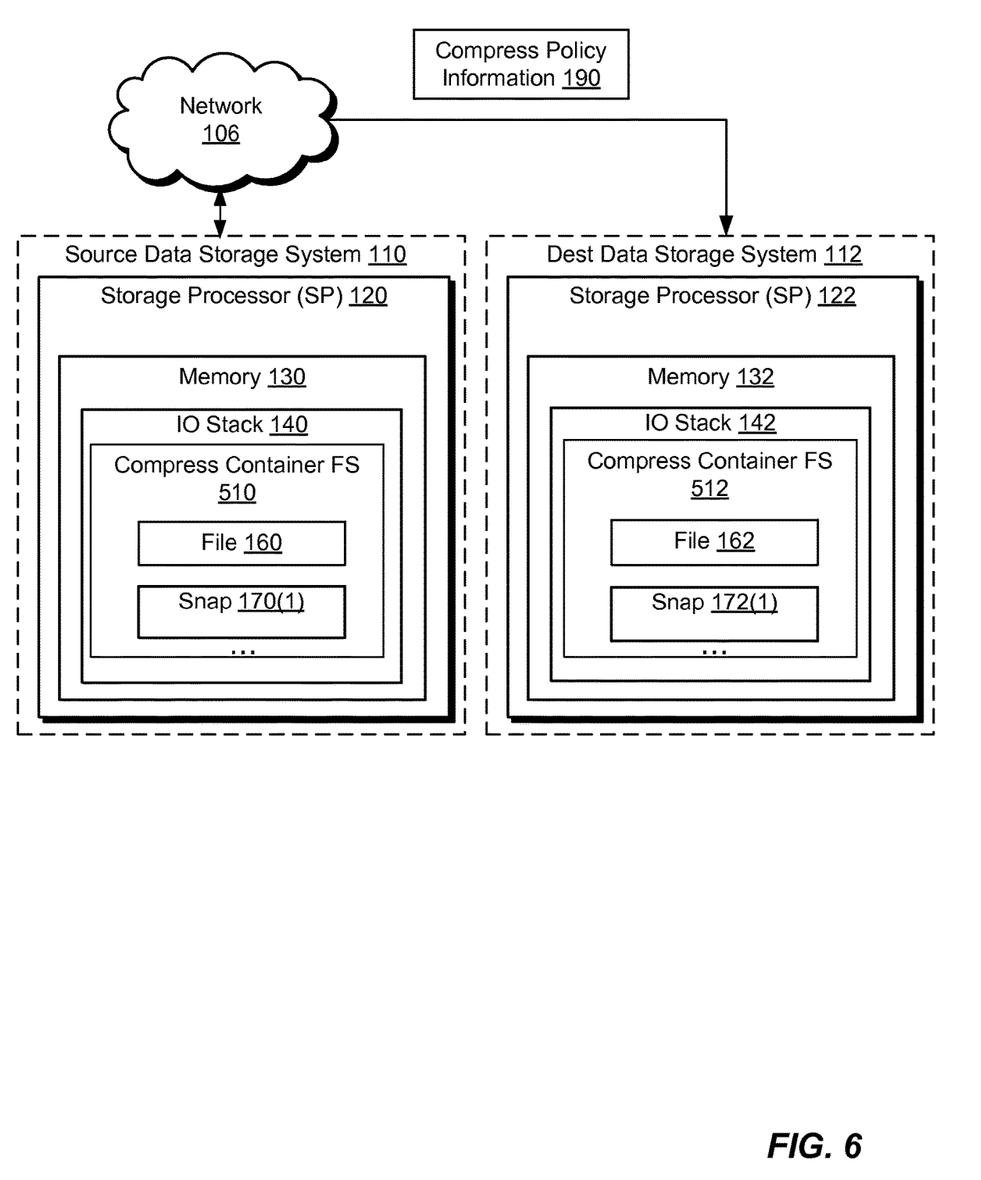
FIG. 6 is a block diagram illustrating example deduplication and compression operations in the electronic environment of FIG. 1.

FIG. 6 illustrates further examples of mirroring data objects realized in container files and associated snaps. Here, the container file system 510 on source 110 supports compression operations.

In this example, an attribute value describing the policies specified by container policy information 190 (FIG. 5) dictate that the destination 112 build the container file system 512 to support compression operations.

Figure 7:
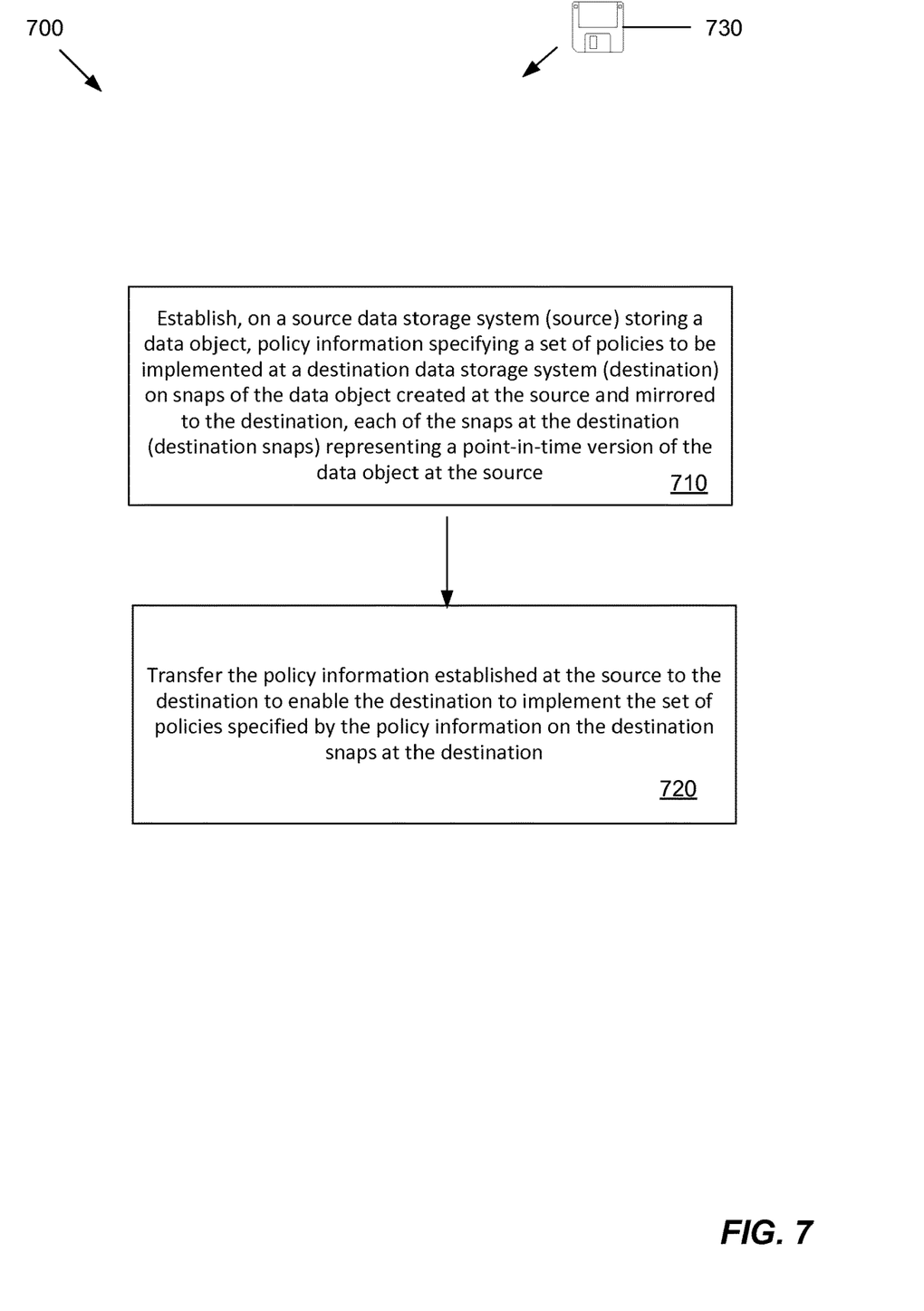
FIG. 7 is a flow chart illustrating a method of carrying out the improved technique in the electronic environment of FIG. 1.

FIG. 7 illustrates an example method 700 of managing snaps of data objects and provides a summary of some of the material presented above. The process 700 may be performed by the software constructs described in connection with FIGS. 1-6, which reside in the respective memories 130 and 132 of the SPs 120 and 122 and are run by the set of respective processing units 123 and 126. The various acts of the process 700 may be ordered in any suitable way. Accordingly, embodiments may be constructed in which acts are performed in orders different from those illustrated, which may include performing some acts simultaneously, even though the acts are shown as sequential in the illustrated embodiments.

At 710, policy information is established on a source data storage system (source) storing a data object. The policy information specifies a set of policies to be implemented at a destination data storage system (destination) on snaps of the data object created at the source and mirrored to the destination. Each of the snaps at the destination (destination snaps) represents a point-in-time version of the data object at the source. For example, a policy may dictate that destination snaps are kept on the destination for a year, while snaps on the source need only be kept for 30 days. In this way, the destination acts as a volume-based archive of snaps of the data object.

At 720, the policy information established at the source to the destination is transferred. The destination is thus enabled to implement the set of policies specified by the policy information on the destination snaps at the destination. In one example, the destination may act in accordance with the set of policies to run a file system consistency check operation on a destination snap in order to provide repair information for a corrupted file system on the source. In another example, the destination may act in accordance with the set of policies to selectively include certain destination snaps in source-initiated file-based recovery operations.

Improved techniques for managing snaps of a data object hosted by the source involve specifying, by the source, a set of policies for snaps of the data object that are stored on the destination. Advantageously, the improved techniques promote a single-point control of snaps of a data object, even when the snaps are located in a different data storage system. Such control promotes various efficiencies as described in connection with FIGS. 3-6 that would not be easily realized if the source and destination established policies separately.

Having described certain embodiments, numerous alternate embodiments or variations can be made. For example, the file system consistency check operation described in connection with FIG. 3 may be generalized to a metadata consistency check for other data objects, such as LUNS and vVols.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 730 in FIG. 7). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of managing snaps of data objects, the method comprising:
    establishing, on a source data storage system (source) storing a data object, policy information specifying a set of policies to be implemented at a destination data storage system (destination) on snaps of the data object created at the source and mirrored to the destination, each of the snaps at the destination (destination snaps) representing a point-in-time version of the data object at the source; and
    transferring the policy information established at the source to the destination to enable the destination to implement the set of policies specified by the policy information on the destination snaps at the destination,
    wherein the data object is a file system,
    wherein the policy information includes snap-specific policy information transmitted from the source to the destination for respective destination snaps,
    wherein the snap-specific policy information for a particular destination snap includes a file system consistency check policy, the file system consistency check policy specifying whether the destination is to perform a file system consistency check on the destination snap to verify that file system metadata of the destination snap is internally consistent,
    and wherein the method further comprises receiving, by the source, a result of a file system consistency check performed by the destination on the particular destination snap, the result indicating a set of errors in the metadata of the particular destination snap, the set of errors including an error indicating that the destination found certain metadata within the particular snap to be inconsistent with other metadata within the particular snap,
    wherein the policy information includes data-object-specific policy information transmitted from the source to the destination for the destination snaps of the data object created at the source and mirrored to the destination, and
    wherein the data-object-specific policy information for the destination snaps of the data object created at the source and mirrored to the destination includes a file-based restore policy, the file-based restore policy specifying a fraction of the destination snaps on which a file-based restore operation may be performed to restore, to the data object on the source, a file in a destination snap of the fraction of the destination snaps.

2. A method as in claim 1, wherein the set of policies to be implemented at the destination includes a retention policy to be implemented on one or more of the destination snaps, the retention policy specifying a length of time that the destination snaps are to be retained at the destination, and
wherein the method further comprises retaining, by the destination, a set of the snaps at the destination for a length of time not less than the length of time specified by the retention policy.

3. A method as in claim 2,
wherein the snap-specific policy information for a particular destination snap includes a file-based restore policy, the file-based restore policy specifying whether a file-based restore operation may be performed on the destination snap to restore a file in the destination snap to the data object on the source.

4. A method as in claim 3, further comprising:
receiving, by the source from a host, a request to perform the file-based restore operation, the request pertaining to a particular directory in the file system;
obtaining, from the destination by the source, a list of the destination snaps that include the specified directory; and
restoring, from one of the destination snaps on the list of destination snaps, a set of files in the specified directory to the specified directory on the file system on the source.

5. A method as in claim 2, wherein the set of policies includes a deduplication policy, the deduplication policy specifying whether the destination is to perform block-based deduplication on the destination snaps;
wherein the method further comprises the destination performing block-based deduplication on the destination snaps in response to the deduplication policy indicating that the destination is to perform block-based deduplication on the destination snaps.

6. A method as in claim 2, wherein the set of policies a compression policy, the compression policy specifying whether the destination is to perform data compression on the destination snaps;
wherein the method further comprises the destination performing data compression on the destination snaps in response to the compression policy indicating that the destination is to perform data compression on the destination snaps.

7. A method as in claim 2, further comprising:
providing a container file system in the source for storing source container files that realize the data object and snaps of the data object at the source,
wherein the set of policies includes a container file system policy specifying a configuration of a destination container file system in the destination for storing the destination snaps, and
wherein transferring the policy information to the destination enables the destination to configure the destination container file system as specified by the container file system policy.

8. A method as in claim 2, further comprising:
on the source, comparing a first source snap of the data object with a second source snap of the data object to produce a difference;
transmitting the difference from the source to the destination; and
on the destination, adding the difference to a first destination snap to produce a second destination snap, the first destination snap being a mirror of the first source snap and the second destination snap being a mirror of the second source snap, wherein the policy information includes snap-specific policy information transmitted from the source to the destination for respective destination snaps, and
wherein transferring the snap-specific policy information from the source to the destination is performed when transmitting the difference from the source to the destination.

9. A method as in claim 1, further comprising:
updating the data object at the source to correct the set of errors indicated in the result of a file system consistency check performed by the destination.

10. A method as in claim 1, further comprising:
receiving, by the source, a result of a second file system consistency check performed by the destination on a second destination snap, the result indicating that the second destination snap is in a consistent state, and
upon a detection of improper behavior of the data object at the source, restoring the data object at the source from the second destination snap at the destination.

11. A method as in claim 1 wherein transferring the policy information established at the source to the destination includes specifying an event, in the snap-specific policy information for the particular destination snap, which triggers the destination to perform the file system consistency check on the particular file system.

12. A method as in claim 11 wherein, when receiving the result of the file system consistency check performed on the destination, the method further includes receiving, by the source from the destination, suggestions for repairing the file system.

13. A system configured to manage snaps of data objects, the system comprising:
a source data storage system (source); and
a destination data storage system (destination),
the source data storage system constructed and arranged to:
establish policy information specifying a set of policies to be implemented at a destination data storage system (destination) on snaps of the data object created at the source and mirrored to the destination, each of the snaps at the destination (destination snaps) representing a point-in-time version of the data object at the source; and
transfer the policy information established at the source to the destination to enable the destination to implement the policies specified by the policy information on the destination snaps at the destination,
wherein the data object is a file system,
wherein the policy information includes snap-specific policy information transmitted from the source to the destination for respective destination snaps,
wherein the snap-specific policy information for a particular destination snap includes a file system consistency check policy, the file system consistency check policy specifying whether the destination is to perform a file system consistency check on the destination snap to verify that file system metadata of the destination snap is internally consistent,
wherein the source is further constructed and arranged to receive a result of a file system consistency check performed by the destination on the particular destination snap, the result indicating a set of errors in the metadata of the particular destination snap, the set of errors including an error indicating that the destination found certain metadata within the particular snap to be inconsistent with other metadata within the particular snap, wherein the policy information includes data-object-specific policy information transmitted from the source to the destination for the destination snaps of the data object created at the source and mirrored to the destination, and wherein the data-object-specific policy information for the destination snaps of the data object created at the source and mirrored to the destination includes a file-based restore policy, the file-based restore policy specifying a fraction of the destination snaps on which a file-based restore operation may be performed to restore, to the data object on the source, a file in a destination snap of the fraction of the destination snaps.

14. A system as in claim 13, wherein the set of policies to be implemented at the destination includes a retention policy to be implemented on one or more of the destination snaps, the retention policy specifying a length of time that the destination snaps are to be retained at the destination, and wherein the destination is constructed and arranged to retain a set of the snaps at the destination for a length of time not less than the length of time specified by the retention policy.

15. A system as in claim 14,
wherein the snap-specific policy information for a particular destination snap includes a file-based restore policy, the file-based restore policy specifying whether a file-based restore operation may be performed on the destination snap to restore a file in the destination snap to the data object on the source.

16. A system as in claim 15, wherein the controlling circuitry of the source is further constructed and arranged to:
receive, by the source from a host, a request to perform the file-based restore operation, the request pertaining to a particular directory in the file system;
obtain, from the destination by the source, a list of the destination snaps that include the specified directory; and
restore, from one of the destination snaps on the list of destination snaps, a set of files in the specified directory to the specified directory on the file system on the source.

17. A system as in claim 13, wherein the source is further constructed and arranged to:
update the data object at the source to correct the set of errors indicated in the result of a file system consistency check performed by the destination.

18. A system as in claim 13, wherein the controlling circuitry of the source is further constructed and arranged to:
receive a result of a second file system consistency check performed by the destination on a second destination snap, the result indicating that the second destination snap is in a consistent state, and upon a detection of improper behavior of the data object at the source, restore the data object at the source from the second destination snap at the destination.

19. A computer program product comprising a non-transitory, computer-readable storage medium which stores executable code, which when executed by a computer, causes the computer to perform a method of managing snaps of data objects, the method comprising:
establishing, on a source data storage system (source) storing a data object, policy information specifying a set of policies to be implemented at a destination data storage system (destination) on snaps of the data object created at the source and mirrored to the destination, each of the snaps at the destination (destination snaps) representing a point-in-time version of the data object at the source; and
transferring the policy information established at the source to the destination to enable the destination to implement the set of policies specified by the policy information on the destination snaps at the destination,
wherein the data object is a file system,
wherein the policy information includes snap-specific policy information transmitted from the source to the destination for respective destination snaps,
wherein the snap-specific policy information for a particular destination snap includes a file system consistency check policy, the file system consistency check policy specifying whether the destination is to perform a file system consistency check on the destination snap to verify that file system metadata of the destination snap is internally consistent,
wherein the method further comprises receiving, by the source, a result of a file system consistency check performed by the destination on the particular destination snap, the result indicating a set of errors in the metadata of the particular destination snap, the set of errors including an error indicating that the destination found certain metadata within the particular snap to be inconsistent with other metadata within the particular snap,
wherein the policy information includes data-object-specific policy information transmitted from the source to the destination for the destination snaps of the data object created at the source and mirrored to the destination, and
wherein the data-object-specific policy information for the destination snaps of the data object created at the source and mirrored to the destination includes a file-based restore policy, the file-based restore policy specifying a fraction of the destination snaps on which a file-based restore operation may be performed to restore, to the data object on the source, a file in a destination snap of the fraction of the destination snaps.

* * * * *